Feb. 24, 1942. J. WEINBERGER 2,274,569
INTERNAL COMBUSTION ENGINE
Filed Aug. 22, 1940 6 Sheets-Sheet 1
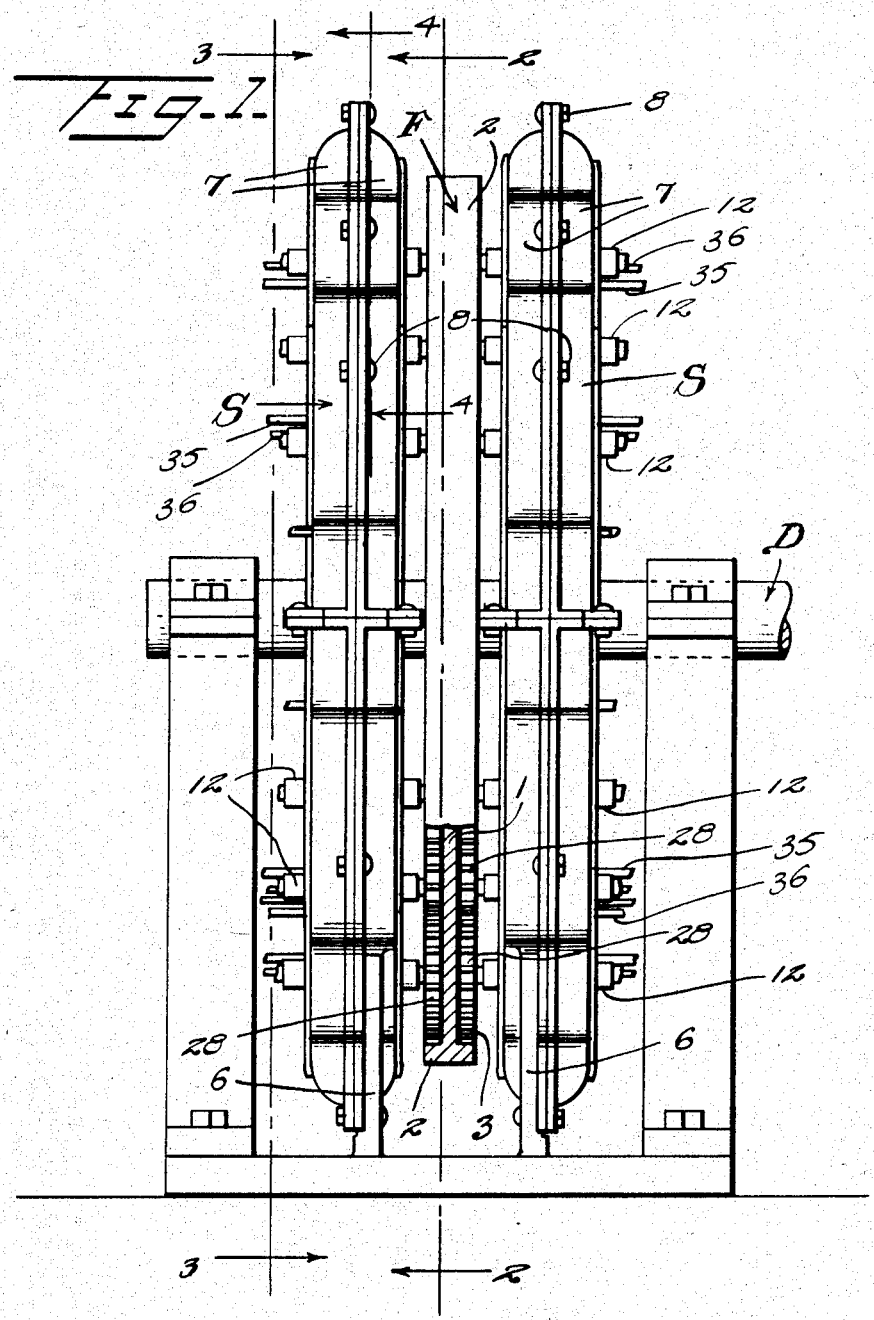
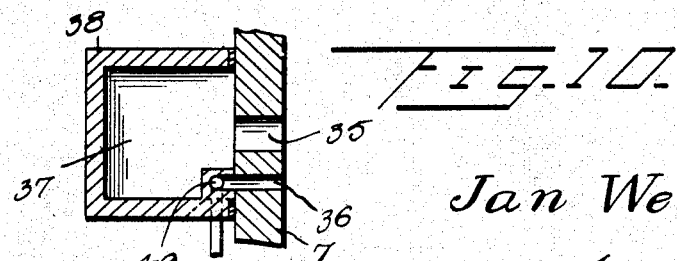
Inventor
Jan Weinberger
By Watson E. Coleman
Attorney Feb. 24, 1942.  J. WEINBERGER  2,274,569
INTERNAL COMBUSTION ENGINE
Filed Aug. 22, 1940  6 Sheets-Sheet 2

Inventor
Jan Weinberger
By Watson E. Coleman
Attorney

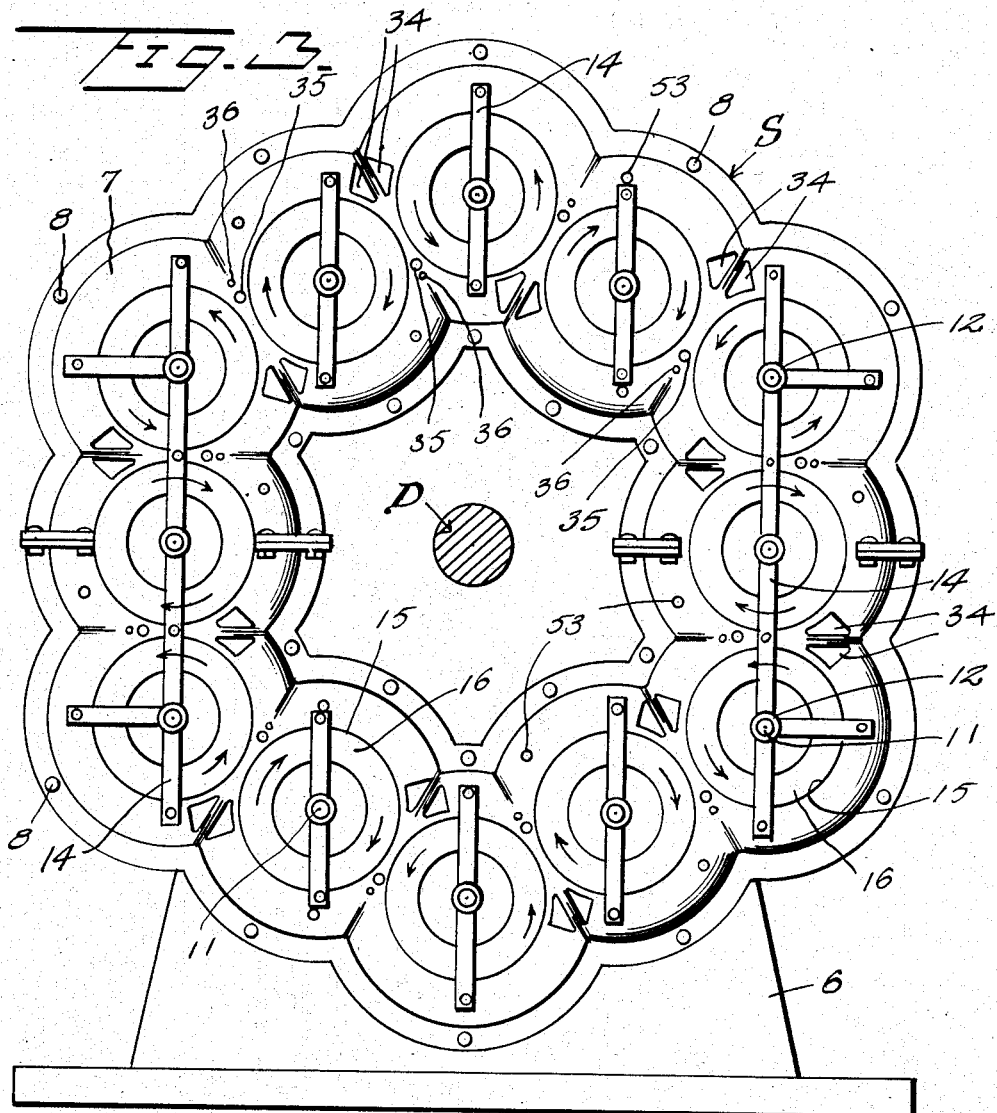
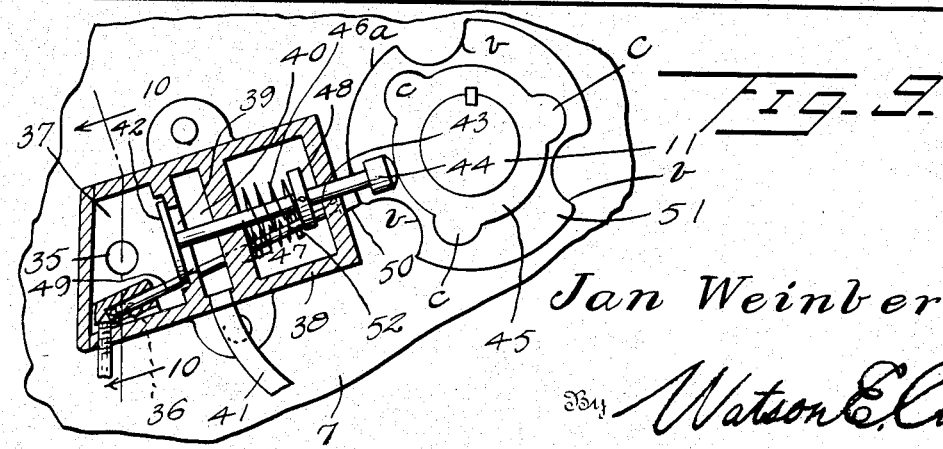

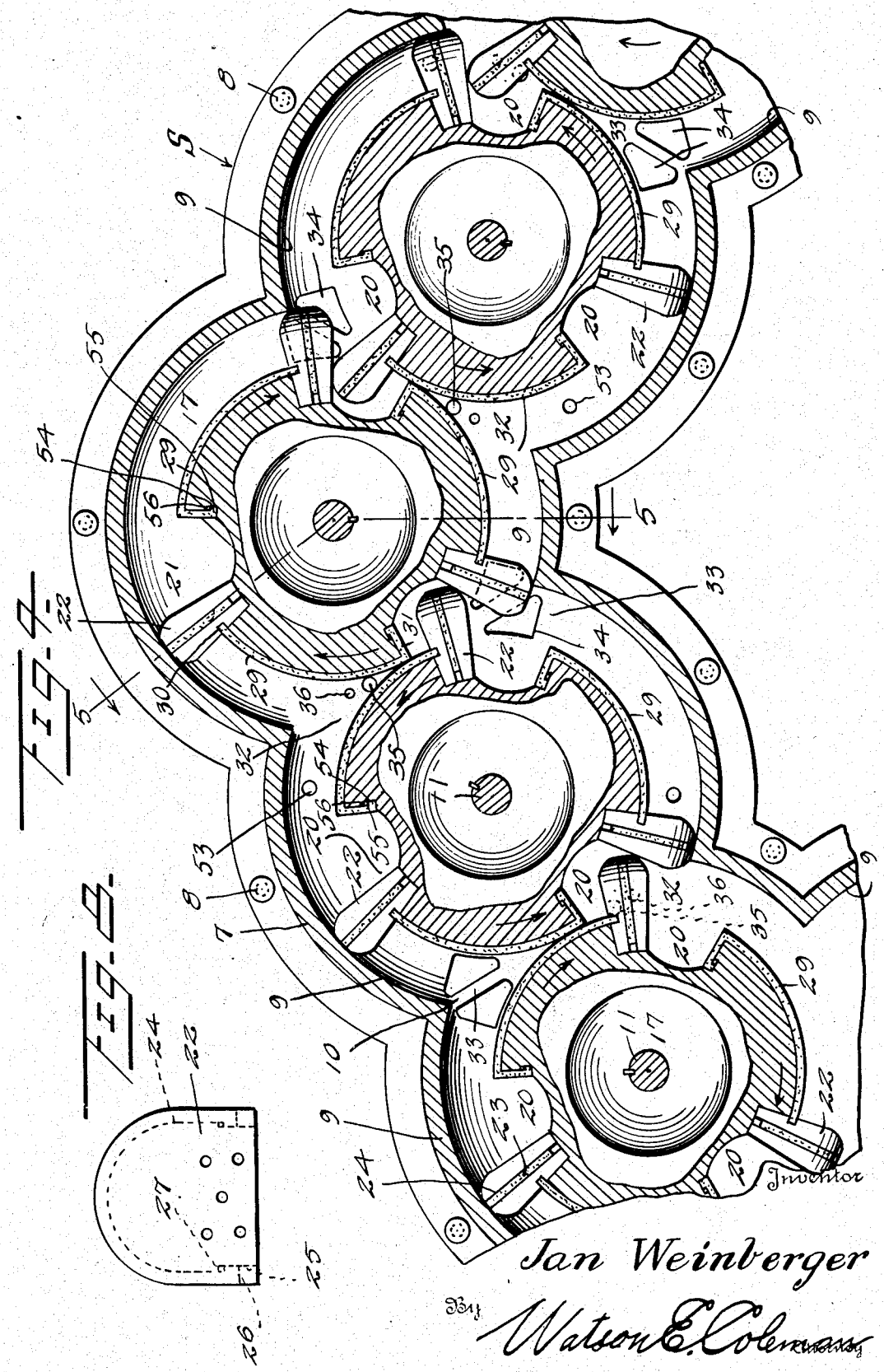

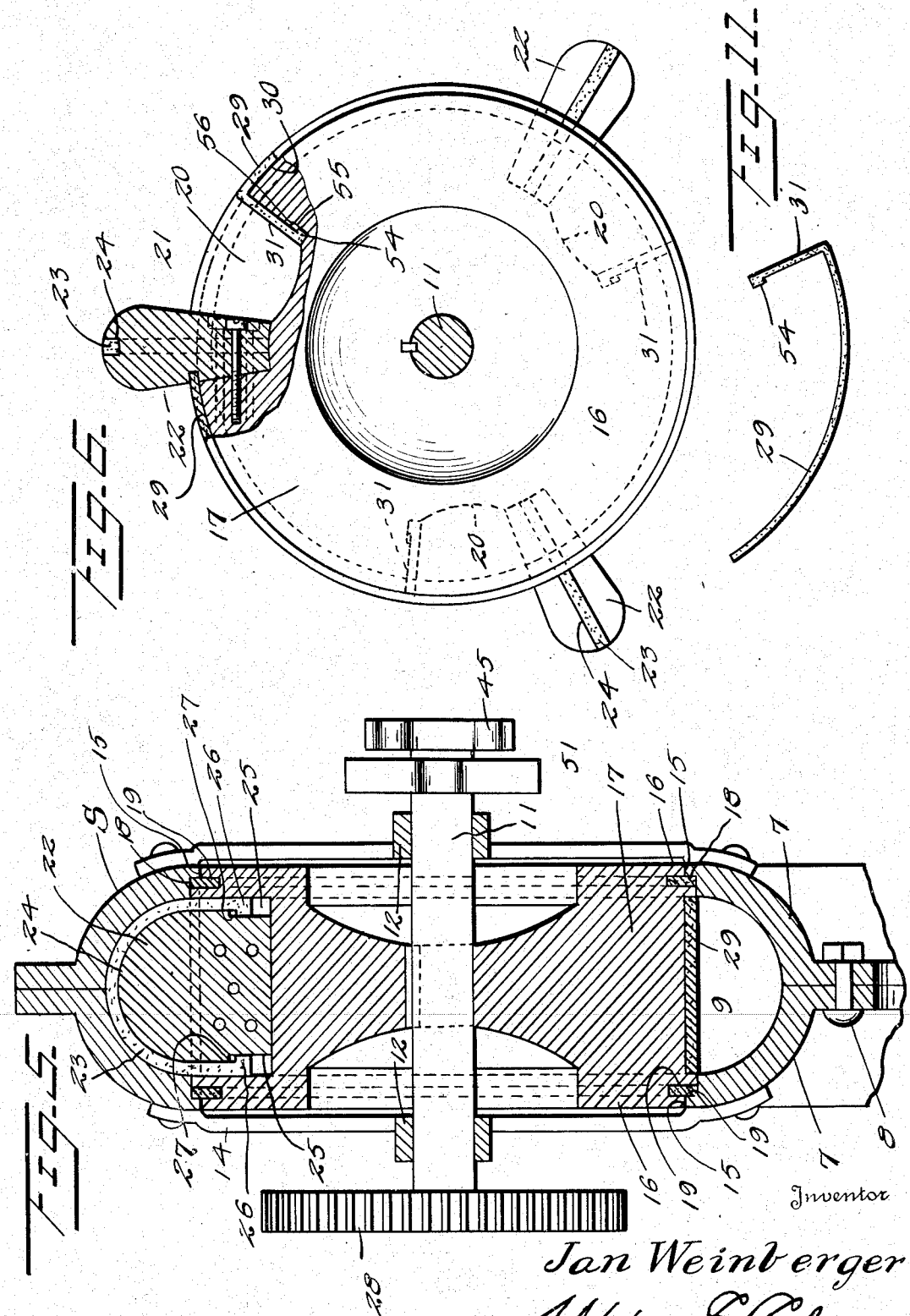

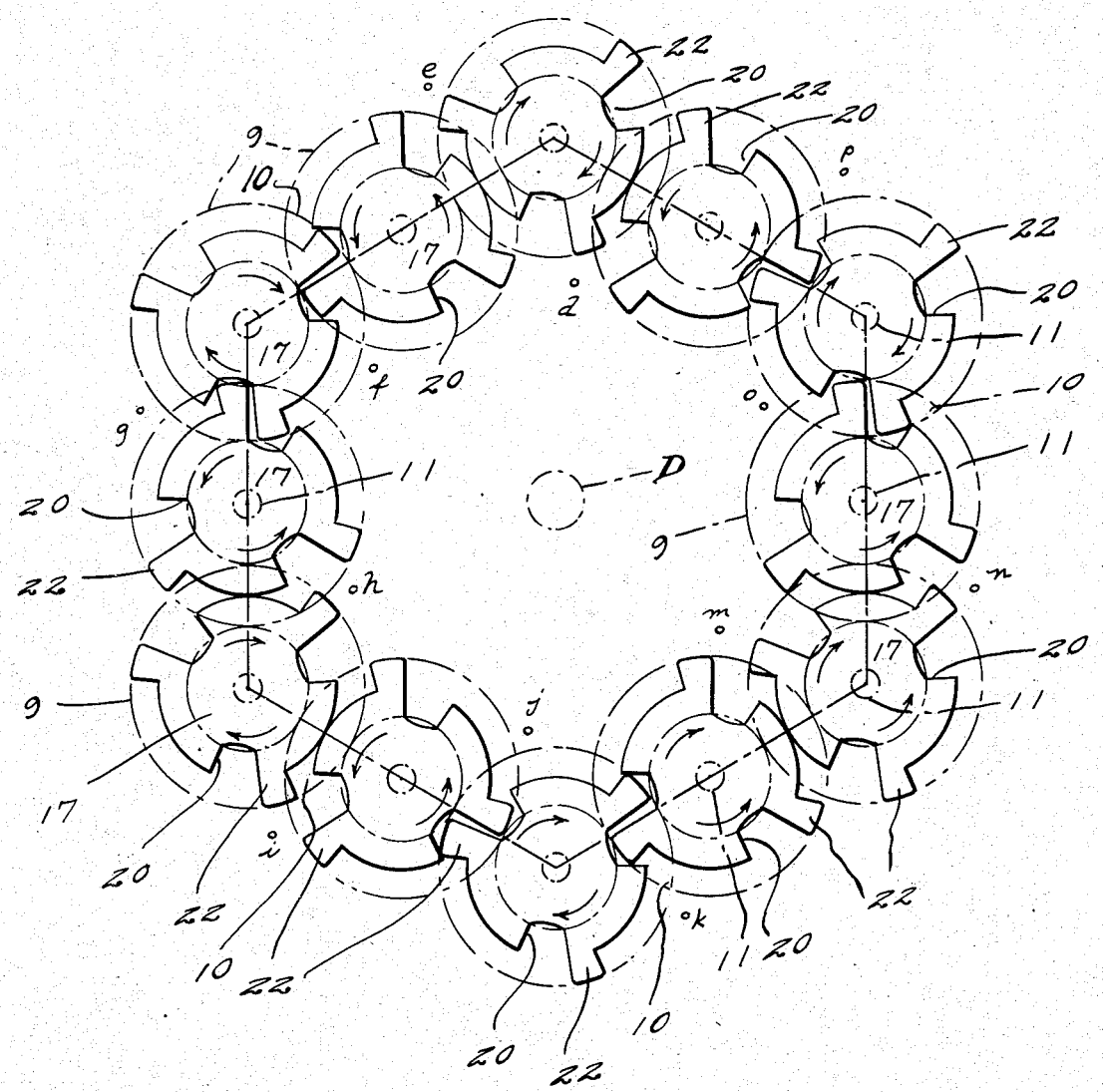

Patented Feb. 24, 1942

2,274,569

UNITED STATES PATENT OFFICE 2,274,569

INTERNAL COMBUSTION ENGINE

Jan Weinberger, Truro, Nova Scotia, Canada

Application August 22, 1940, Serial No. 353,738

5 Claims. (Cl. 123—12)

This invention relates to an internal combustion engine, and it is an object of the invention to provide an engine of this kind wherein the drive shaft is in operative connection with a plurality of rotary members each of which is explosive driven and in a manner whereby the connection between the rotary members and the drive shaft is free of any reciprocating parts, thus providing an engine operating with a minimum loss of power.

It is also a particular object of the invention to provide an internal combustion engine constructed in a manner to provide for the use of two fuels of different explosive characters, for example an ordinary gaseous fuel together with a liquid explosive such as nitro-glycerin, the gaseous fuel serving as an igniter for the liquid fuel.

Another object of the invention is to provide an engine or motor comprising a plurality of rotary elements concentrically arranged with respect to a drive shaft and wherein each of said rotary elements has driving connection with the shaft.

A further object of the invention is to provide an engine or motor of an internal combustion type comprising a plurality of rotating elements concentrically arranged around a drive shaft with each of said rotating elements operating within a separate cylinder or chamber with adjacent cylinders or chambers in communication and the members within said cylinders or chambers carrying pistons or blades in close contact with the internal walls of the cylinders or chambers, together with means for admitting and exploding a fuel charge between the pistons or blades of two adjacent rotating elements.

The invention consists in the details of construction and in the combination and arrangement of the several parts of my improved internal combustion engine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation of an internal combustion engine constructed in accordance with an embodiment of my invention, a portion being broken away and the valve mechanisms being omitted;

Figure 3 is a vertical sectional view taken substantially on the line 3—3 of Figure 1;

Figure 4 is an enlarged fragmentary sectional view taken substantially on the line 4—4 of Figure 1;

Figure 5 is an enlarged detailed sectional view taken substantially on the line 5—5 of Figure 4;

Figure 6 is a view in side elevation of the rotary member as illustrated in Figure 5 with a portion broken away and the associated shaft being in section;

Figure 8 is a view in front elevation of one of the pistons or blades as herein embodied;

Figure 9 is a fragmentary detailed view partly in section and partly in elevation illustrating a means for controlling the admission of the fuels within the firing chamber of each pair of adjacent cylinders or chambers;

Figure 10 is a detailed sectional view taken substantially on the line 10—10 of Figure 9;

Figure 11 is an elevational view of a packing member for use in connection with a rotary member;

Figure 12 is a diagrammatic view illustrating the sequential firing.

As disclosed in the accompanying drawings, my improved motor or engine comprises a suitably supported drive shaft D from which power is adapted to be taken off in any manner desired. This power may be taken directly from the shaft D or, if desired, from the fly or balance wheel F fixed upon the shaft D for rotation therewith.

Figure 2:
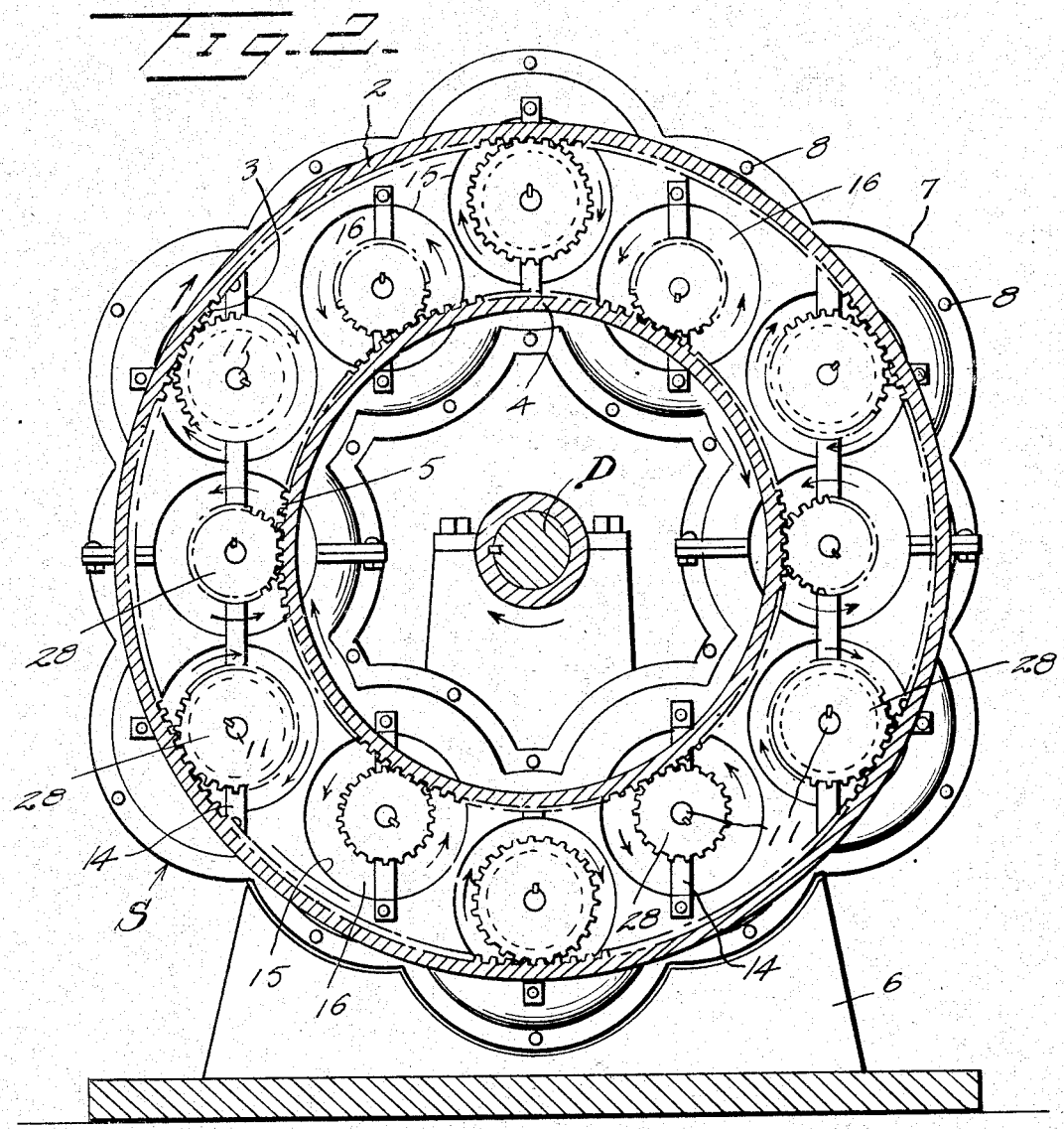
Figure 2 is a vertical sectional view taken substantially on the line 2—2 of Figure 1 looking in the direction of the arrows.
Figure 7:
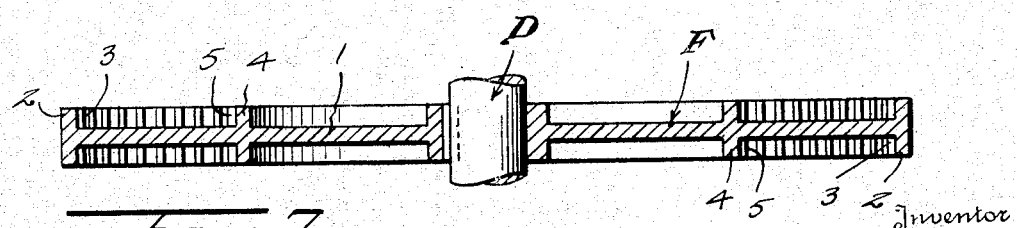
Figure 7 is a detailed horizontal sectional view taken through the fly or balance wheel as herein embodied, the associated drive shaft being shown fragmentarily in plan.

As is particularly illustrated in Figures 1 and 2 of the drawings, the fly or balance wheel F comprises a plate 1 of desired radius and which is provided at its periphery with the oppositely directed flanges 2. These flanges 2 extend beyond opposite sides of the plate 1 and the inner faces thereof are formed to provide the continuous circular racks 3. This plate 1 at a desired point inwardly of the flanges 2 is also formed to provide the oppositely directed flanges 4 concentric to the flanges 2 and having their outer faces formed to provide the continuous annular racks 5. As is clearly illustrated in Figure 7 of the drawings, the racks 3 and 5 are concentric to the drive shaft D.

Suitably supported, as at 6, at each side of the fly or balance wheel F is an annular stator S. As each of these stators and the parts associated therewith are of substantially the same construction and assembly it is only believed necessary, for the purpose of disclosure, to give a detailed description of one. It might be added, however, that the two assemblies are employed in order to assure a more effective driving of the shaft D.

Each of the stators S may be constructed as the requirements of practice may determine but, as herein disclosed, each of these stators S comprises two overlying members 7 bolted, as at 8, or otherwise maintained in assembled relation. An assembled stator S is concentric to the shaft D and the interior thereof is formed to provide therearound a series of cylinders or chambers 9 of desired radii with each pair of adjacent cylinders or chambers 9 in communication, as at 10. The axes of these cylinders or chambers 9 are parallel to the drive shaft D and disposed axially through each of the cylinders or chambers 9 is the shaft 11 rotatably supported by the bearings 12 carried by the spiders 14 secured to the opposite outer sides of the stator S or more particularly the members 7 thereof.

Each of the cylinders or chambers 9 opens through the side walls of the members 7 of the stator S and snugly but rotatably fitting within such openings 15 are the end portions 16 of a rotating element or rotor 17. Coacting with said end portions 16 and the edge faces defining the openings 15 are the metallic packing rings 18 which are received within the grooves 19. At a plurality of points equidistantly spaced therearound and preferably at three locations, the rotor or member 17 is formed with a relatively large pocket 20. This pocket 20 extends circumferentially of the rotor or member 17 and securely anchored, as at 21, to an end wall of this pocket 20 is a plunger or impeller blade 22. This blade 22 extends outwardly beyond the rotor or member 17 sufficiently to have close contact with the internal wall of the stator S outwardly of the opening 15. To assure the sealing of such contact, the outer face of the piston or blade 22 is provided with a metallic packing 23.

In the present embodiment of my invention and as particularly illustrated in Figures 5 and 8 of the drawings, the packing 23 is substantially U-shaped and straddles the outer or extended portion of the piston or blade 22. The coacting face portion of the piston or blade 22 is provided with a groove 24 to receive such packing. This groove 24 as well as the packing 23 extend inwardly of the pocket 20 and the end portions of the groove 24 are inwardly and transversely enlarged, as at 25, to receive the inwardly disposed projections 26 at the ends of the packing 23. By this means the packing 23 is effectively maintained in applied position at all times, and it is to be particularly noted that the projections 26 are spaced from the resultant shoulders 27 provided by the enlargements 25. This is of particular advantage because allowance is made for the packing 23 to move outwardly under centrifugal force during the rotation of the rotor or member 17 and which rotation is at a high speed and thereby assuring effective sealing.

As particularly illustrated in Figures 2, 3 and 4 of the drawings, adjacent cylinders or chambers 9 and the rotors or members 17 therein are radially offset one with respect to the other with the alternate cylinders or chambers 9 and the rotors or members 17 therein on the same radii. This arrangement is important and essential as the rotors or members 17 in the outermost cylinders or chambers 9 have driving connection with an outer rack 3 while the intermediate rotors or members 17 have driving connection with an inner rack 5. The shaft 11 of each of the rotors or members 17 has an extended portion carrying a gear 28 in mesh with either the rack 3 or the rack 5. As will hereinafter be pointed out, adjacent rotors or members 17 rotate in opposite directions and, therefore, it will be readily apparent that the fly or balance wheel F under action of all of the rotors or members 17 will be driven in the same direction, and at this time it is to be particularly noted that each and every one of the rotors or members 17 constitutes a driving element.

As particularly illustrated in Figure 4 of the drawings, the peripheries of adjacent rotors or members 17 are in close contact and to effectively seal such contact the peripheries of the rotors or members 17 between the pistons or blades 22 and the pockets 20 in advance thereof have snugly engaged thereover resilient packing plates 29. One end portion of each of the plates 29 is engaged within a groove 30 in the back face of a piston or blade 22 while the opposite end portion of the plate is provided with an inwardly disposed flange 31 which extends within a pocket 20 in advance of said piston or blade 22 and having close contact with the rear end of said pocket. By this arrangement the packing plate 29 is effectively maintained in applied position under all conditions yet is free to have outward rocking movement under centrifugal action during the rotation of the rotor or member 17 to assure the maintenance of effective sealing contact between adjacent rotors or members 17.

Each pair of adjacent rotors or members 17 are in contact substantially midway of the communication between adjacent cylinders or chambers 9 whereby is provided what may be termed a firing chamber 32 and an exhaust chamber 33 at the sides of said point of contact between two adjacent rotors or members 17. It is to be particularly noted that these chambers 32 and 33 are alternately in reverse relation so that as an explosion occurs within a chamber 32 the two adjacent rotors or members 17 will be caused to rotate in reverse directions as, of course, such explosion occurs between adjacent pistons or blades 22 after they have passed a predetermined distance beyond the point of contact of two adjacent rotors or members 17. Each chamber 33 has in communication therewith the relatively large exhaust openings 34 which, in the present embodiment of my invention, are also in direct communication with the atmosphere. These openings 34 are arranged in pairs with each of said openings closely adjacent to each other but with one opening 34 in each one of the two adjacent cylinders or chambers 9. In communication with each of the firing chambers 32 and at points closely adjacent to the contact between the adjacent rotors or members 17 are the intake ports 35 and 36, the port 35 leading to a source of gaseous fuel under pressure and the port 36 being in communication with a source of liquid explosive. Each of the ports 35, as particularly illustrated in Figures 9 and 10, is in direct communication with a fuel compartment 37 comprised in a housing 38 of suitable dimensions anchored in desired position upon the stator S.

This compartment 37 is in communication through a port 39 with a second compartment 40 and this compartment 40 has discharging therein a pipe line 41 which leads from a suitable source of supply of gaseous fuel under pressure.

The gaseous fuel readily flows from the compartment 40 through the port 39 into the compartment 37 and from the compartment 37 through the port 35 into a firing chamber 32. Return flow, however, from the compartment 37 to the compartment 40 is prevented by the valve 42 carried by a stem 43. This stem 43 is disposed exteriorly of the housing 38 and the outer or exterior end portion, as particularly illustrated in Figure 9, carries a head 44 for coaction with a cam member 45 fixed upon the shaft 11 of one of the rotors or members 17 and for rotation with said shaft. This valve 42 is normally maintained seated by an expansible coil spring 46 of requisite tension, said spring encircling the stem 43 and positioned between the partition or septum 47 and an enlargement or head 48 fixed upon the stem 43 within the outer portion of the housing 38.

Flow of the liquid explosive into a firing chamber 32 through a port 36, as herein disclosed, is under control of a reciprocating needle valve 49. This valve 49 also extends exteriorly of the housing 38 and its extended or exterior extremity is provided with a head 50 for coaction with a cam 51. This needle valve 49 is normally maintained in its closed position by contact of the exterior head 50 thereof with the concentric portions $a$ of the cam 51. The needle valve 49, however, is constantly urged outwardly toward the cam 51 by a suitably arranged expansible spring 52. The concentric portions $a$ of the cam 51 are herein disclosed as three in number and are equidistantly spaced with the peripheral portions of the cam 51 between adjacent concentric portions $a$ recessed, as at $b$ to provide low points to a depth sufficient to permit required intermediate outward movement of the needle valve 49 in such timed sequence in which it is desired to open the port 36 for the flow of a liquid explosive within the firing chamber 32. These recesses $b$ are three in number due to the fact that each of the rotors or members 17 is provided with three equidistantly and circumferentially spaced pistons or blades 22. For the same reason the cam 45 is provided with three circumferentially and equidistantly spaced high points $c$ each operating in proper timed sequence to move the stem 43 inwardly to hold the valve 42. The period of time during which the valve 42 is maintained open by a high point $c$ depends upon the amount of gaseous fuel desired to be delivered within a firing chamber 32. It is also to be noted in Figure 9 that the low points $b$ are positioned slightly to the rear of the high points $c$ so that the liquid explosive will not be admitted within the firing chamber 32 until after the valve 42 has been opened. It is also to be noted that the port 36 for the explosive liquid is of relatively small diameter as in the use of an explosive liquid it is not necessary that the charge delivered within a firing chamber 32 be of undue volume.

It is to be noted that in Figure 4 of the drawings the pistons or blades 22 of adjacent rotors or members 17 are so positioned that the piston or blade 22 of one of the rotors or members 17 closely follows behind the piston or blade 22 of the adjacent rotor or member 17 and which action is readily permitted by the pockets 20 which readily receive the extended portions of the pistons or blades 22 and which pockets are of sufficient length to offer no hinderance or obstruction to the rotation of the rotors or members 17. These pistons or blades 22 are substantially in close contact during the period they pass across the bight of the adjacent rotors or members 17 and after the pistons or blades 22 pass the ports 35 and 36 both the gaseous fuel and the liquid explosive are received within the firing chamber 32 and between the pistons or blades 22 of the adjacent rotors or members 17 which at that time are moving in divergent directions one with respect to the other.

Within the firing chamber 32 at a predetermined point beyond the bight of the adjacent rotors or members 17 is mounted an igniter 53 of any desired character and which functions immediately upon the passage of a piston or blade 22 therebeyond whereby the charge within the firing chamber 32 is exploded with resultant impelling action upon the functioning pistons or blades 22 of the adjacent rotors or members 17. The pistons or blades 22 of each of the rotors or members 17 will successively coact and cooperate with the pistons or blades 22 of an adjacent rotor or member 17 so that said rotors or members 17, each of which is individually driven, results in the creation of effective power which is transmitted to the shaft D and/or its fly or balance wheel F as hereinbefore explained.

It is to be noted that the exhaust openings 34 are so positioned that shortly after each explosion a piston or blade 22 will pass thereover to open the firing chamber to the atmosphere for the purposes of exhaust. These exhaust openings 34 are relatively large to permit the rapid exhaust of the expansive force of the liquid explosive to avoid any disastrous affect of such expansion upon the stator or any of the parts associated therewith.

By having a plurality of chambers 9 and members 17 therein concentrically arranged around the shaft D, a sufficient number of such chambers and members may be employed to permit a plurality of simultaneous firings at equidistantly spaced points around the shaft D. For example, in the present embodiment of my invention I show the use of twelve of such chambers 9 and associated members 17 and as each of the members 17 is provided with three equidistantly spaced pistons or blades 22, there will be three explosions in connection with each rotor or member 17 or thirty-six in connection with all of such rotors or members. The present assembly, therefore, is such as to provide six simultaneous explosions at equidistantly spaced points around the stator. As diagrammatically illustrated in Figure 12 of the drawings, there are twelve firing chambers identified in this particular view as $d, e, f, g, h, i, j, k, m, n, o, p$ and the simultaneous explosions are in sequence as follows: First $d, e, h, i, m, n$; second, $f, g, j, k, o, p$; third, $d, e, h, i, m, n$; fourth, $f, g, j, k, o, p$; fifth, $d, e, h, i, m, n$; and sixth, $f, g, j, k, o, p$. By this it will be readily observed that the simultaneous explosions occur in series of six and upon every turn of the rotors or members 17 through sixty degrees. In this connection it is to be stated that in order to increase the efficiency of the power output, the successive explosions of one of the units as illustrated in Figure 1 is midway of the successive explosions of the second unit.

The ratio of the gears 28 with respect to their racks 3 or 5 is one to seven so that in the compound assembly as illustrated in Figure 1 there will be five hundred and four explosions to each revolution of the shaft D or the fly or balance wheel F rotating therewith.

It is believed to be apparent that this multiple explosion action can be readily obtained with a motor constructed in a manner which is not only extremely simple but relatively light in weight making it particularly adaptable for use in connection with aircraft although I do not wish to be understood as limiting myself to this particular use. It is also believed to be apparent from the foregoing that the explosions occur in such sequence as to assure effective balance of the engine or motor.

As is clearly indicated in Figures 4 and 6, the inwardly disposed flange 31 of each of the packing plates 29 is provided at its outer or free end portion with a transversely disposed and inwardly directed bead or flange 54 which is received within a pocket or recess 55 provided in the lower part of the adjacent end wall of a pocket 20. This recess 55 results in a shoulder 56 with which the bead or flange 54 contacts and thereby means is provided for effectively maintaining the packing plate 29 in applied or working position. It is to be noted that under normal conditions, as illustrated in Figures 4 and 6, there is a space between the bead or flange 54 and the shoulder 56 sufficient to allow outward rocking movement of the plate 29 under centrifugal force.

It is believed to be readily understood that the exhaust openings 34 do not have to be in the exact locations illustrated in the accompanying drawings but can be placed at such other location as may be preferred and which location can be best determined by the nature or character of the explosives used.

From the foregoing description it is thought to be obvious that an internal combustion engine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An internal combustion engine comprising a power shaft, a stator surrounding said shaft and provided with an annular series of cylinders substantially concentrically arranged around the power shaft, the axes of the cylinders being substantially parallel to the shaft, a fly wheel fixed to the shaft to one side of the stator, a rotor mounted in each of the cylinders, a shaft for each of the rotors disposed toward the fly wheel and extending exteriorly of the stator, concentric flanges extending out from the face of the fly wheel opposed to the stator, the inner faces of the flanges being formed to provide continuous circular racks, a gear carried by the extended portion of the shaft of each of the rotors meshing with one of the circular racks of the fly wheel, the various gears alternately meshing with said racks with a single gear in mesh with one rack and free of the other, and means for admitting and exploding a fuel charge within the cylinders for rotating adjacent rotors in opposite directions.

2. An internal combustion engine comprising a power shaft, a stator surrounding said shaft and provided with an annular series of cylinders substantially concentrically arranged around the power shaft, the axes of the cylinders being substantially parallel to the shaft, a fly wheel fixed to the shaft to one side of the stator, a rotor mounted in each of the cylinders, a shaft for each of the rotors disposed toward the fly wheel and extending exteriorly of the stator, concentric flanges extending out from the face of the fly wheel opposed to the stator, the inner faces of the flanges being formed to provide continuous circular racks, a gear carried by the extended portion of the shaft of each of the rotors meshing with one of the circular racks of the fly wheel, the various gears alternately meshing with said racks with a single gear in mesh with one rack and free of the other, and means for admitting and exploding a fuel charge within the cylinders for rotating adjacent rotors in opposite directions, adjacent cylinders and rotors therein being radially offset, one with respect to the other, with alternate cylinders and rotors therein being on the same radii.

3. An internal combustion engine comprising a power shaft, a stator surrounding said shaft and provided with an annular series of cylinders substantially concentrically arranged around the power shaft, the axes of the cylinders being substantially parallel to the shaft, a fly wheel fixed to the shaft to one side of the stator, a rotor mounted in each of the cylinders, a shaft for each of the rotors disposed toward the fly wheel and extending exteriorly of the stator, concentric flanges extending out from the face of the fly wheel opposed to the stator, the inner faces of the flanges being formed to provide continuous circular racks, a gear carried by the extended portion of the shaft of each of the rotors meshing with one of the circular racks of the fly wheel, the various gears alternately meshing with said racks with a single gear in mesh with one rack and free of the other, each pair of adjacent cylinders being in communication, each pair of adjacent rotors being in rolling contact through the communication between the associated pair of cylinders, the contacting bight between adjacent rotors constituting an abutment for an exploded charge, outwardly directed pistons carried by the rotors, the force of the exploding charge being imposed upon said pistons to rotate adjacent rotors in opposite directions, and means for admitting and exploding a fuel charge within the cylinders.

4. An internal combustion engine comprising a power shaft, a stator surrounding said shaft and provided with an annular series of cylinders substantially concentrically arranged around the power shaft, the axes of the cylinders being substantially parallel to the shaft, a fly wheel fixed to the shaft to one side of the stator, a rotor mounted in each of the cylinders, a shaft for each of the rotors disposed toward the fly wheel and extending exteriorly of the stator, concentric flanges extending out from the face of the fly wheel opposed to the stator, the inner faces of the flanges being formed to provide continuous circular racks, a gear carried by the extended portion of the shaft of each of the rotors meshing with one of the circular racks of the fly wheel, the various gears alternately meshing with said racks with a single gear in mesh with one rack and free of the other, each pair of adjacent cylinders being in communication, each pair of adjacent rotors being in rolling contact through the communication between the associated pair of cylinders, the contacting bight between adjacent rotors constituting an abutment for an exploded charge, outwardly directed pistons carried by the rotors, the force of the exploding charge being imposed upon said pistons to rotate adjacent rotors in opposite directions, and means for admitting and exploding a fuel charge within the cylinders, the means for admitting and exploding the fuel charge being alternately positioned between adjacent rotors at opposite sides of the contacting bights between adjacent rotors.

5. An internal combustion engine comprising a power shaft, a stator surrounding said shaft and provided with an annular series of cylinders substantially concentrically arranged around the power shaft, the axes of the cylinders being substantially parallel to the shaft, a fly wheel fixed to the shaft to one side of the stator, a rotor mounted in each of the cylinders, a shaft for each of the rotors disposed toward the fly wheel and extending exteriorly of the stator, concentric flanges extending out from the face of the fly wheel opposed to the stator, the inner faces of the flanges being formed to provide continuous circular racks, a gear carried by the extended portion of the shaft of each of the rotors meshing with one of the circular racks of the fly wheel, the various gears alternately meshing with said racks with a single gear in mesh with one rack and free of the other, each pair of adjacent cylinders being in communication, each pair of adjacent rotors being in rolling contact through the communication between the associated pair of cylinders, the contacting bight between adjacent rotors constituting an abutment for an exploded charge, outwardly directed pistons carried by the rotors, the force of the exploding charge being imposed upon said pistons to rotate adjacent rotors in opposite directions, and means for admitting and exploding a fuel charge within the cylinders, the peripheries of the rotors adjacent to their pistons being provided with pockets, the pocket of one rotor receiving the piston of an adjacent rotor.

JAN WEINBERGER.